Patented Jan. 13, 1931

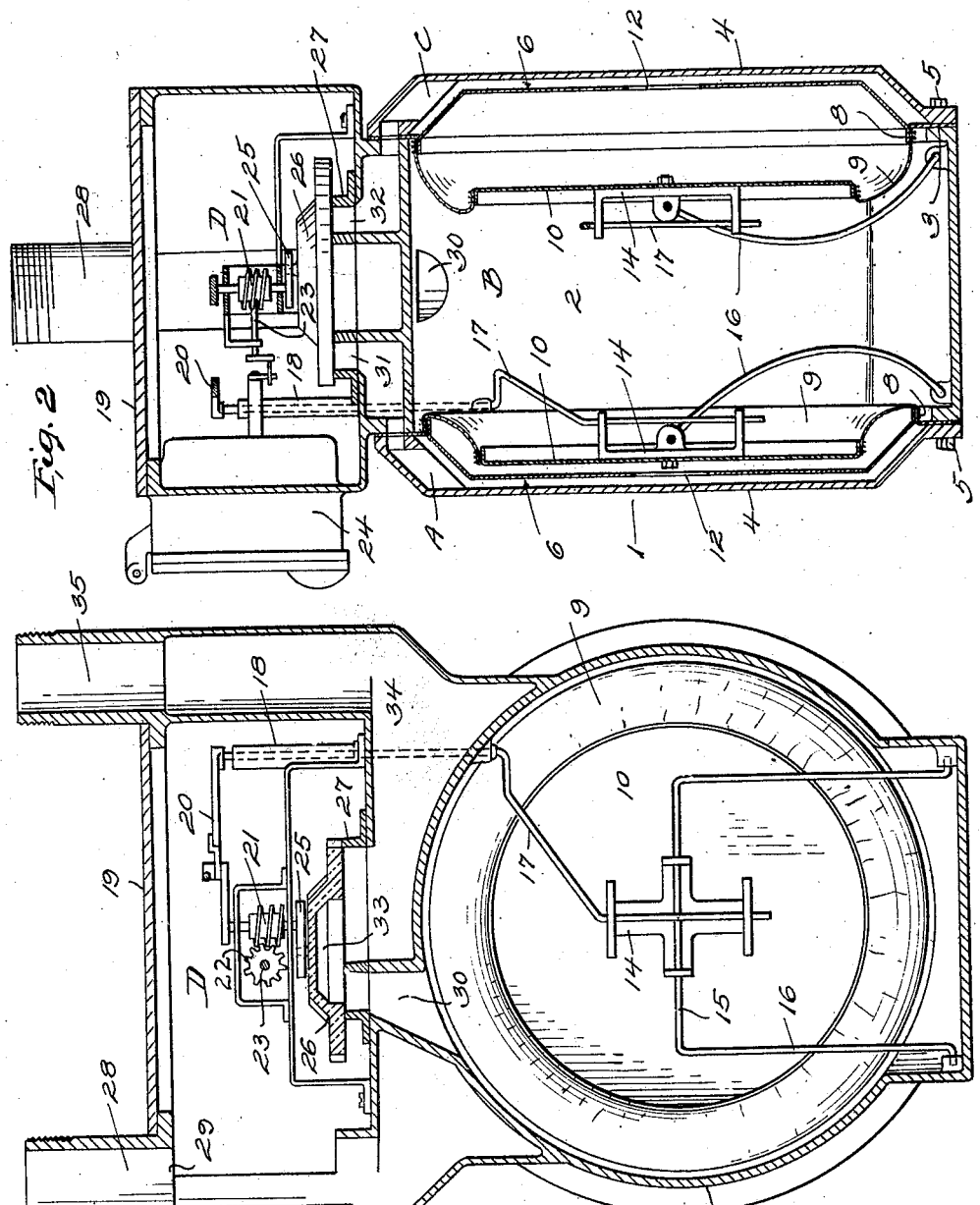

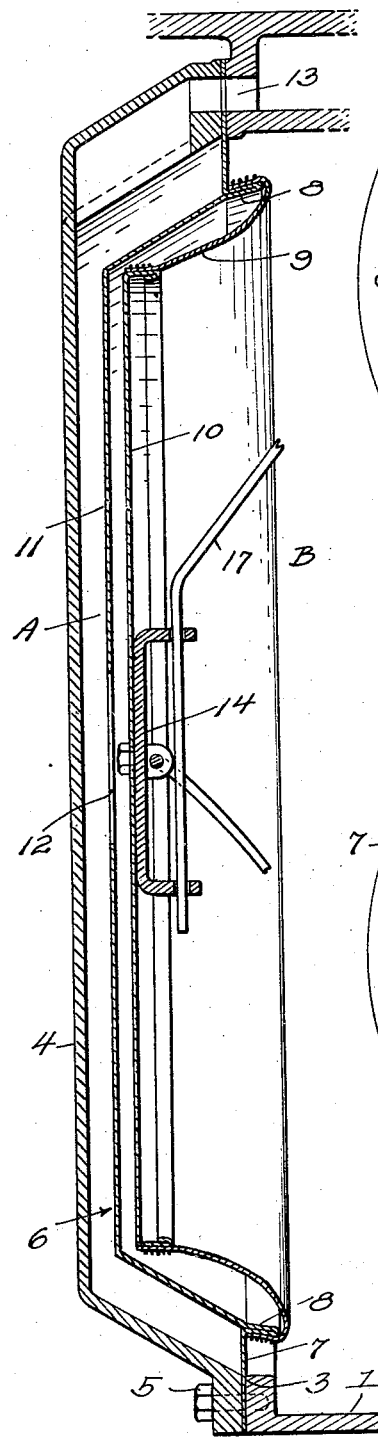
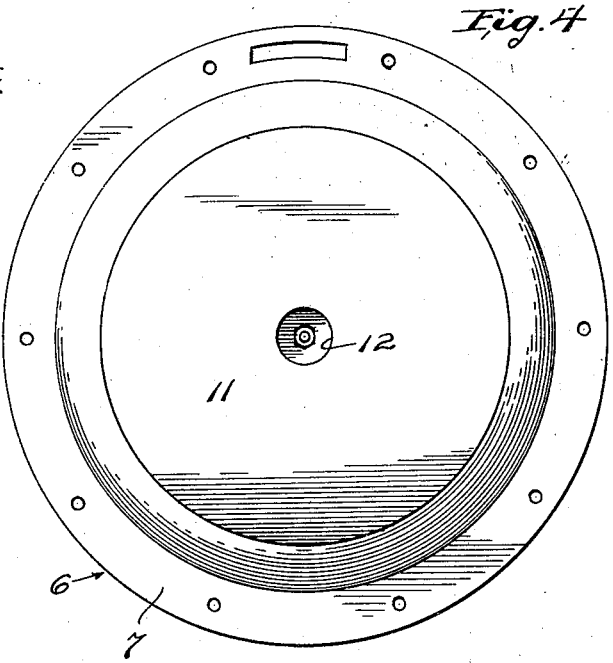
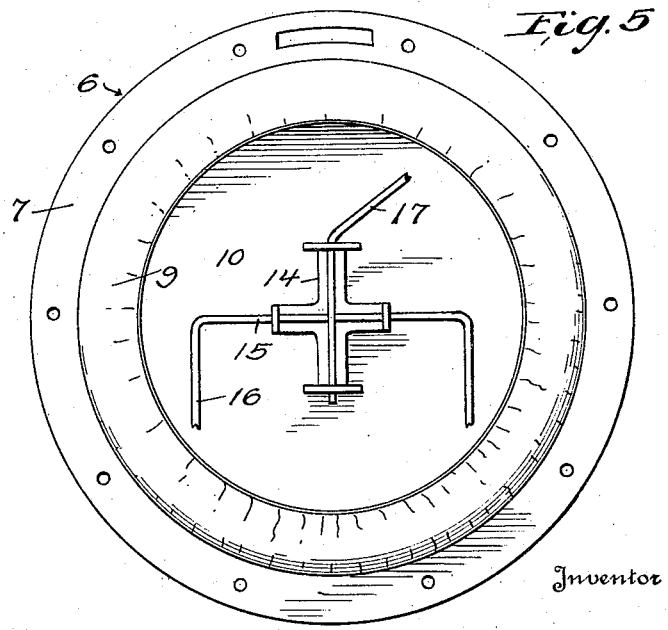

1,788,754

UNITED STATES PATENT OFFICE

HOMER J. WADDELL, OF BALTIMORE, OHIO, ASSIGNOR, BY MESNE ASSIGNMENTS, TO METER PARTS COMPANY, A CORPORATION OF OHIO

GAS METER

Original application filed September 20, 1927, Serial No. 220,805. Divided and this application filed September 19, 1928. Serial No. 306,968.

This invention relates to improvements in gas meters of the type employed by gas distributing companies for the purpose of registering volumetrically gas flow through certain conduits or, in other words, to measure gas consumption, the invention is applicable particularly to the so-called "iron case" type of meter, or to that type which is formed to include a body consisting of a metal casing which is accessible through the medium of removable end or cover plates. It is a primary object of the invention to provide a meter of this type with an improved diaphragm structure which is situated between the body of the casing and one of the removable cover plates in such manner as to support a pair of gas measuring chambers, valve means being provided in connection with the meter for controlling the flow of gas successively to said chambers so that the diaphragm structure is constantly subjected on its opposite sides to the unbalanced fluid pressures, whereby the diaphragm pulsates, as usual, back and forth to impart control motion to associated gas flow registering devices.

It is another object of the invention to provide an iron case type of meter with an improved diaphragm structure so formed as to prevent deleterious residue or deposit, carried entrained with the gas, from coming into contact and interfering with the operation of the leather or other flexible member of the diaphragm structure. This deposit has been found to be distinctly injurious and detrimental to the life and operation of said flexible member by causing the latter to quickly decompose and lose its life and flexible characteristics and, therefore, in the present invention prevents this condition by providing a trap for such residue or deposit which prevents the latter from coming into contact with the leather or other flexible area of the diaphragm. The present invention is directed particularly to the diaphragm structure per se and as such it constitutes a true division of my earlier co-pending application Serial Number 220,805, filed September 20, 1927, directed to improvements in gas meters.

For a further understanding of the invention reference is to be had to the following description and the accompanying drawings wherein:

Figure 1 is a vertical sectional view taken longitudinally through a gas meter provided with the improved diaphragm structure comprising the present invention, Figure 2 is a transverse sectional view taken through the middle, the plane of which being at right angles to the plane of the view shown in Figure 1, Figure 3 is an enlarged vertical sectional view disclosing more particularly the construction of the diaphragm, Figure 4 is a view in front elevation of the diaphragm, and Figure 5 is a view in rear elevation.

Referring more particularly to the drawings, the numeral 1 designates the main body of the meter, which is in the form of an annular casting and is constructed to include an enlarged gas measuring chamber 2 in the center thereof. This chamber is provided with open ends terminating adjacent to the flat vertical sides 3 of the body. Screwed or otherwise removably secured to the sides 3 are end plates or covers 4—4, which have their marginal edges provided with flanges which are flatly contiguous to the flanges of the body constituting the sides 3. Screws or the like 5 are used to retain the plates 4 in secure engagement with the sides 3.

In accordance with the present invention diaphragms 6 are utilized which have their peripheral portions clamped between the sides 3 and the plates 4 and which serve to divide the lower part of the meter into gas measuring chambers which are designated by the letters A, B and C.

Each of the diaphragms consists of an outer metallic ring or gasket 7 of flat sheet metal material, suitably apertured at intervals to admit of the passage of the screws 5 therethrough, in order that when the latter are tightened the ring or gasket 7 will be securely positioned between its complemental cover plate 4 and the body 1, the said ring serving in the capacity of a gasket to prevent the uncontrolled escape of gas through the openings defined in the housing of the motor between said removable end plates and the body 1.

The ring 7 of each of the diaphragm structures terminates around its inner edge in an inwardly directed flange 8 which is disposed immediately adjacent to the circular wall of the chamber B. To this flange there is secured the flexible leather section 9 of the diaphragm. This may be effected in the customary manner common to devices of this class, namely, by tightly wrapping the outer edge of the leather section through the medium of a cord or the like so that said leather section along its outer edged portion will be rigid and stationarily secured to the laterally extending flange of the ring or gasket 7. The inner edge of the leather section 9 is similarly rigidly secured by wrapping or otherwise to the outer circumferential portion of the inner and movable metallic diaphragm section 10, which is adapted to reciprocate, as customary, back and forth in response to the gas pressures of an unbalanced character applied to the opposite sides thereto through regulated gas flow into the chambers A, B and C. In this respect it will be observed that the diaphragm structure so far described corresponds closely in construction and principle to the diaphragm set forth and claimed in my prior Patent Number 1,646,376, dated October 18, 1927.

An important feature of the present invention resides in extending the outer metallic part 7 of the diaphragm to include a divisional wall 11 which may be either integrally formed with or otherwise attached to the ring or gasket 7. The divisional wall 11 is stationarily situated between one or the other or both of the plates 4 and the inner section 10 of the diaphragm, and as shown comprises a metallic plate dished or concaved to allow movement of the diaphragm. The wall 11 is formed with an axial opening 12, and it will be seen, by reference to Figure 2, that when the gas enters the chamber A of the meter by way of a passage 13, formed in each of the plates 4, the ring or gasket 7 and the sides 3, the gas travels between the wall 11 and the adjacent plate 4 and finally into contact with the diaphragm by way of the opening 12, producing operative movement on the part of the inner section 10 of said diaphragm, since when gas is introduced into the chamber A it may be exhausted from the chamber B. This construction is provided in order that the gas entering the chambers A or C will be so directed that any foreign matter entrained in the gas, such as thick gum or acid containing residue, will be trapped and confined in the spaces formed between the walls 11 and the plates 4 and positively prevented from entering the meter in such a manner as to come into direct contact with the flexible leather sections 9 of the diaphragm. This residue has been found to exercise a distinctly injurious action on the perishable leather portion of the diaphragm, and by the use of the wall 11 the residue is kept away from the leather portion of the diaphragm and conveyed to zones where it can be conveniently removed from time to time. In addition, the walls 11 protect the leather section of the diaphragm from the effects of heat, particularly the structure serving to provide a double walled protection which enables the leather sections to maintain a desired operating temperature and prevents the leather from prematurely drying out. This is of benefit where the meters are placed in locations adjacent to a source of heat such as a furnace, heat conveying conduits or the like. By removing the end plates 4—4 it will be seen that the diaphragm structure of the meter and the accumulated residue deposit may be removed from the meter in a complete and convenient manner.

The remaining features of the meter shown in the accompanying drawings have been set forth and claimed in my co-pending application above identified and are therefore not specifically claimed hereinafter. However, for the purpose of explaining the operation of the diaphragm structure and its relation to the meter, the following description is offered.

Mounted centrally upon each of the sections 10 of the diaphragm structures and located within the chamber B is a bracket 14 of substantially cross shaped form, to the horizontal arms of which there are connected a pair of links 15 which, in turn, are connected with the horizontal rung of a pair of pivoted bails 16. Each of these bails has its lower end pivotally mounted in connection with bearings or ears stationarily formed in the bottom of the case. Each bail 16 serves to support the inner section of each diaphragm and to provide for its regulated and uniform movement in a manner customary to devices of this kind.

The vertical legs of each of the brackets 14 are provided with outturned ears formed with registering openings for the reception of the lower crank shaped extensions of the flag arms 17. These arms extend upwardly through bearings 18 formed in the body 1 and the upper ends of said arms terminate within a linkage compartment D provided in the extreme upper part of the meter. This compartment is rendered accessible by an opening formed in the top of the meter normally closed by a removable top plate 19. The crank arms are adapted to oscillate back and forth and in so doing effect, through the medium of links 20, the rotation of a vertically disposed worm 21. This worm engages with a corresponding worm wheel 22 provided with a shaft 23 which when rotated effects the operation of a registration or index mechanism 24 of any suitable type. Also, the bottom of the worm is connected with a crank arm 25 to which is connected a valve disc 26. This disc is of the usual glass type provided in connection with rotary valve gas meters, which includes a flat lower surface which rests upon a partitioned valve spider 27. As is customary in valves of this type the operation of the crank arm 25 results in imparting an eccentric rotary motion to the valve disc, moving the latter successively across the valve ports of the spider 27 which movement, in turn, controls the successive inflow and exhausting of the gas from the measuring chambers A, B and C in a manner well known to those skilled in the art. The body 1 is provided with the usual upright gas inlet conduit 28, which enters the compartment D by way of the opening 29. In this manner the compartment D, during normal operation of the meter, is constantly filled with gas or other fluid under measurement. It will be seen that by the rotary movement of the disc 26 there will be accomplished at regularly timed intervals the opening of a port 30 which establishes communication between the compartment D and the compartment of middle chamber B of the meter, permitting the latter to receive a regulated supply of gas. Similarly, the rotation of the disc uncovers the passages 31 and 32 which are employed to establish communication between the chambers A and C and the chamber D, permitting gas to flow from the compartment D at regulated intervals to the chambers A and C. Further, due to the provision of the pocket 33 in the under side of the valve disc and the eccentric motion of the disc the port 30 and the channels 31 and 32 will be successively registered with a channel or passage 34 which leads from said pocket to the outlet of the conduit 35 of the meter.

It will be understood that the present invention is directed broadly to diaphragm structures applicable for use in connection with any standard type of iron case meter, and I therefore do not limit myself to the specific details of meter design above set forth but reserve the right to utilize said invention in any capacity and in any such structure wherein it may be found useful. It is therefore intended that the specific description above given shall not be considered as limiting the invention but merely as a vehicle of expressing the same, the invention being limited only by the specific structure described in the following claims.

What is claimed is:

1. In a gas meter, a casing including a diaphragm chamber open at one end, a removable cover section closing the open end of said chamber, a diaphragm structure formed to occupy said chamber and embodying an outer ring member of rigid material secured between the adjacent walls of said casing and cover section, said ring member being formed to include a flange lying substantially parallel with the inner walls of said diaphragm walls, an inner disc member of rigid material formed to include a peripheral flange, a body of flexible connecting material secured to the flanges of said ring and disc members, said material possessing sufficient area to admit of the employment of a disc member of large diameter and displacement commensurate with the length of the operating stroke of the disc member from one side to the other of the operating plane of the outer ring member, and a wall carried by said outer ring member and situated between said diaphragm structure and said removable cover section, said last named wall being provided with a centrally situated opening, said wall and cover section providing a trap to receive residue contained in the gas under measurement.

2. In a gas meter, a casing formed to include a body section and a removable cover section, a diaphragm structure secured within said meter and having the outer peripheral portion thereof clamped between said body and removable cover plate, and a stationary wall situated between said diaphragm structure and said removable cover plate, said wall being arranged beyond the path of operation of said diaphragm structure and so formed as to constitute a trap to prevent deleterious substances from coming into contact with the diaphragm structure.

3. In a gas meter, a casing formed to include a body open at one end, a cover removably clamped to said body, a diaphragm structure positioned between said body and said cover and securely clamped therebetween, and a perforated plate stationarily positioned between said diaphragm structure and said cover.

4. In a gas meter, a casing formed to include a body open at one side, a removable cover for the open side of said body, a diaphragm structure having the outer peripheral portion thereof clamped between said cover and said body, and a residue trapping plate stationarily positioned between said cover and said diaphragm, the axial portion of said plate being provided with a gas port, said port providing the sole avenue of gas flow from the space provided between said cover and plate into contact with said diaphragm structure.

5. A diaphragm structure for gas meters comprising an outer metallic ring provided with a laterally projecting flange, an inner metallic disc member provided with a peripheral flange, a flexible section securely connected with the flanges of said ring and disc member, and a residue trapping plate connected with said ring member and opened at one side of the diaphragm structure, the central portion of said plate being provided with an opening.

6. A diaphragm structure for gas meters comprising an outer ring, an inner disk member, a flexible member secured to said outer ring and said disk member, and a residue trapping plate connected with said ring member and provided with a gas opening.

7. The invention as defined in claim 6 wherein said residue trapping plate is concaved away from said disk member.

8. In a gas meter, a main meter casing adapted to receive measured quantities of gas therein, a diaphragm structure secured in said casing including a flexible portion and adapted to pulsate in said casing, said casing having a passageway for admitting gas to said diaphragm structure and a perforated residue trapping plate interposed between said passageway and said diaphragm structure.

9. In a gas meter, an open-ended meter casing adapted to receive measured quantities of gas therein, a diaphragm structure secured to said casing over the open end thereof and including a flexible portion, a cover secured to the open end of said casing, said cover having a passageway for admitting gas to said casing, and a perforated residue trapping plate interposed between said passageway and said diaphragm structure.

10. The invention as defined in claim 9 wherein said plate is interposed between said cover and said diaphragm structure.

In testimony whereof I affix my signature.

HOMER J. WADDELL.